United States Patent Office 2,898,368
Patented Aug. 4, 1959

2,898,368

PRODUCTION OF VITAMIN A AND VITAMIN A ESTERS

Horst Pommer, Ludwigshafen (Rhine), Germany, assignor to Badische Anilin- & Soda-Fabrik Aktiengesellschaft, Ludwigshafen (Rhine), Germany No Drawing. Application December 23, 1957
Serial No. 704,256

Claims priority, application Germany December 24, 1956

6 Claims. (Cl. 260—488)

This invention relates to a process for the production of vitamin A and vitamin A esters from axerophten.

The object of the invention is achieved by treating axerophten, if desired in the presence of acylating agents, with selenium dioxide and preferably also with mercury salts.

In the simplest case, the reaction according to this invention may be described by the following formulae:

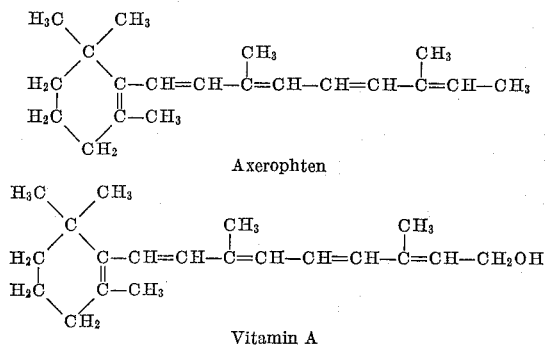

When the reaction is carried out in the presence of acylating agents, the corresponding esters of vitamin A are directly obtained, for example vitamin A acetate when using acetic anhydride.

The axerophten serving as initial material has recently become available synthetically; see for example the copending U.S. patent applications Ser. No. 534,156, filed September 13, 1955, by Georg Wittig and Horst Pommer, and Ser. No. 559,516, filed January 17, 1956, now abandoned, by Horst Pommer and Georg Wittig.

The present invention is therefore a new method, usable technically, for the synthesis of vitamin A and its esters, which is superior in its simplicity to the methods hitherto known (regarding the prior attempts at the synthesis of vitamin A and its esters see the summary of J. Baxter in "Fortschritte der Chemie organischer Naturstoffe," Springer-Verlag, Vienna 1952, volume IX, page 56 et seq.; also O. Isler, Chimia 4 (1950), page 116 et seq., and also N. A. Milas "The Vitamins," volume 1, pages 4 to 58, Academic Press Inc. Publishers, New York).

The process is carried out for example by allowing a solution of axerophten in an organic solvent or liquid which is stable to selenium dioxide under the reaction conditions, such as an alcohol, as for example ethyl alcohol, an ether, as for example dioxane, a hydrocarbon, as for example benzene or cyclohexane, nitrobenzene, acetonitrile, glacial acetic acid or many other solvents well known to experts to flow into a solution or suspension of selenium dioxide in one of the said solvents or another suitable solvent. The most favourable reaction temperature lies between about 0° and +20° C., but it is also possible to work at higher or lower temperatures, approximately between the boiling point of the solvent and −20° C. The oxidation of axerophten to vitamin A proceeds also when the solution or suspension of selenium dioxide is allowed to flow into the solution of axerophten, or when powdered selenium dioxide is added to the solution of axerophten. The concentration of the solution of axerophten may be chosen as desired between wide limits. The reaction described proceeds satisfactorily even in very dilute solutions. The solution or suspension of selenium dioxide may also be varied considerably in concentration. Those skilled in the art will not need any further instruction as to what concentrations should preferably be chosen.

The relative proportions of axerophten and selenium dioxide are preferably selected so that in the oxidation the vitamin A alcohol stage (vitamin A or its ester) is not exceeded or is not exceeded to a great extent. An approximately equivalent ratio is therefore used. To obtain higher yields of the reaction product it is advantageous in many cases to use an excess, amounting to about 10 or 20%, of selenium dioxide.

The reaction begins immediately the axerophten and selenium dioxide meet. The duration of the reaction depends on the temperature and the concentration. Generally applicable prescriptions for the end point cannot therefore be given, but this is not necessary because with the use of the calculated amount of selenium dioxide the reaction proceeds to its end with the desired result.

It is recommendable, but not essential, to bring the axerophten and selenium dioxide together while excluding air.

The process of this invention permits the oxidation of axerophten to vitamin A to be carried out in the presence of acylating agents. Consequently a vitamin A ester can be prepared from axerophten in one working operation. As acylating agents there are suitable for example the anhydrides of organic acids. They may be anhydrides of aliphatic, cycloaliphatic or aromatic acids. By way of example, and not by way of limitation, there may be mentioned acetic anhydride, propionic anhydride and benzoic anhydride. When it is desired to oxidise and acylate in one working operation, the acylating agent, for example acetic anhydride, can serve at the same time as solvent, so that the use of an additional solvent may be dispensed with.

It is believed that in the reaction there is first formed a relatively stable addition product from selenium dioxide and axerophten the desired oxidation stage then being already attained. This addition product gradually decomposes in the desired way with the formation of vitamin A or an ester thereof. The complete decomposition of the addition product and the setting free of the oxidation product (vitamin A or vitamin A ester) can be accelerated by allowing a mercuric compound to act thereon. As such mercury compounds there are especially suitable mercuric salts which are soluble in water. About 1 mol of mercuric salt may be used with reference to 1 mol of selenium dioxide. Very often it is favourable however to use a large excess of mercury salt. Examples of mercury salts which may be used are mercuric chloride, sulphate and acetate. Other inorganic or organic mercuric salts are also suitable.

It is very surprising that by the process of this invention only small amounts of vitamin A aldehyde and other undesirable byproducts are formed. It is true that it is known that in singly unsaturated hydrocarbons the methyl or methylene group in alpha-position to the double linkage is oxidised by selenium dioxide; it is therefore especially astonishing that in axerophten (a highly unsaturated hydrocarbon with a total of four alpha-position methyl groups and one alpha-position methylene group) it is practically only the terminal methyl group which is oxidised, and that to the alcohol stage.

The working up of the reaction mixture is effected by the methods usual in polyene chemistry, as for example by distribution between different kinds of solvents, such as petroleum ether on the one hand and aqueous methanol on the other hand, or/and by chromatography and fractional distillation.

The following examples will further illustrate this invention but the invention is not restricted to these examples. The parts specified in the examples are parts by weight.

*Example 1*

A solution of 54 parts of pure axerophten in 50 parts of dioxane is allowed to flow slowly at 0° C. while stirring into a solution of 11 parts of selenium dioxide in 150 parts of dioxane. It is stirred in a weak stream of nitrogen for 12 hours at 5° to 10° C. and the yellow-red solution then poured into an ice-cold solution of 25 parts of mercuric chloride in 200 parts of water which has been covered with petroleum ether and through which a weak stream of nitrogen is led. After stirring for 6 hours, the precipitate formed is filtered off by suction, the aqueous layer separated from the filtrate and the golden yellow petroleum ether layer washed with 10% mercuric chloride solution and then with water.

To separate the unreacted axerophten from the vitamin A formed, the petroleum ether solution is shaken several times with a total of 2000 parts of 90% methanol. The combined methanol extracts are then again shaken several times with petroleum ether. This operation can also be carried out in a mechanical distribution apparatus. The axerophten remains in the petrolum ether while the bulk of the vitamin A is found in the methanol.

The methanol layer is then diluted with the same volume of water, the mixture extracted with fresh petroleum ether, the resultant petroleum ether extract washed with water and dried over sodium sulphate. After distilling off the solvent under reduced pressure at a maximum of 35° C. there remain behind 38 parts of an oil which consists substantially of vitamin A. In methanol solution it shows an absorption maximum at 325 millimicrons and may be converted by treatment with hydrochloric acid under the conditions specified by O. Isler and collaborators (see Helv. Chim. Acta, volume 30 (1947), page 1922) into anhydro-vitamin A of the melting point 76° to 77° C. By reaction of the solution in ethylene chloride with acetyl chloride and pyridine at —5° C., vitamin A acetate is obtained in the usual way as a viscous yellow oil which in methanol solution shows an absorption maximum at 325 millimicrons and in chloroform shows the known deep cornflower blue colour reaction with antimony trichloride.

*Example 2*

Into a suspension of 11 parts of finely powdered selenium dioxide in a mixture of 90 parts of acetic anhydride and 25 parts of glacial acetic acid, which has been heated at 40° C. for 15 minutes and then cooled again, there are gradually introduced at 5° C. while stirring 54 parts of axerophten. It is stirred for 18 hours at 5° to 15° C. and the deposited selenium then filtered off by suction, washed with petroleum ether and the combined filtrates gradually introduced while stirring and cooling with ice into 180 parts of 10% aqueous ammonia solution which has been covered with a layer of petroleum ether. The petroleum ether layer is powerfully stirred with 300 parts of a 10% aqueous solution of mercuric chloride under nitrogen for 6 hours. Then the greenish-grey precipitate is filtered off by suction, washed with petroleum ether and the aqueous layer separated from the filtrate. The petroleum ether layer is washed with water, dried over sodium sulphate and finally freed from solvent carefully at reduced pressure. 46 parts of an oil consisting substantially of vitamin A acetate ($\lambda_{max}$=324 to 325 millimicrons in methanol, $\epsilon$=30,000) are obtained which can be freed completely from unreacted axerophten by chromatography of its petroleum ether solution on aluminium oxide of the activity 3 to 4 (according to Brockmann). About 6 parts of axerophten are recovered and 31 parts of vitamin A acetate are obtained ($\lambda_{max}$=325 millimicrons in methanol, $\epsilon$=34,000).

*Example 3*

16.5 parts of selenium dioxide are dissolved in 300 parts of dioxane and then at room temperature a solution of 80 parts of axerophten in 100 parts of dioxane are dripped in within 30 minutes while stirring. It is so cooled with icewater that the temperature does not exceed 30° C. it is further stirred for 1 hour and then the dark yellow-red solution is poured into an ice-cold solution of 75 parts of mercuric acetate in 400 parts of water. It is then covered with petroleum ether and stirred for 12 hours while leading in pure nitrogen. The product is filtered, the petroleum ether solution, which is now golden yellow, is separated and washed several times with a total of 1000 parts of a 5% aqueous mercury acetate solution, and then several times with water. The further working up takes place analogously to that described in Example 1. 47 parts of vitamin A alcohol are obtained.

I claim:
1. A process for the oxidation of axerophten to the vitamin A alcohol stage which comprises allowing selenium dioxide in at least about an equivalent amount to act on axerophten at a temperature not lower than —20° C. and below that at which preponderating amounts of by-products are formed
2. The process as claimed in claim 1 wherein a mercuric salt is used as an accelerator in the process of setting free the oxidation product.
3. A process as claimed in claim 1 wherein the oxidation is allowed to proceed in the presence of an anhydride of an organic carboxylic acid as an acylating agent.
4. A process as claimed in claim 3 wherein a mercuric salt is used as an accelerator in the process of setting free the oxidation product.
5. A process for the oxidation of axerophten to the vitamin A alcohol stage which comprises reacting axerophten and about an equivalent amount of selenium dioxide at a temperature not lower than —20° C. and below that at which preponderating amounts of by-products are formed, uniting the reaction mixture with an aqueous solution which contains from about ½ to 5 times the equimolar quantity of a mercuric salt and isolating the alcohol stage of axerophten formed.
6. A process as claimed in claim 5 wherein the oxidation is carried out in the presence of an anhydride of an organic carboxylic acid as an acylating agent.

References Cited in the file of this patent

UNITED STATES PATENTS 2,537,622    Butler _____ Jan. 9, 1951

OTHER REFERENCES

Guillemonat: Ann. Chim. (Paris) [11], 11, 150–164 (1939).